Oct. 13, 1970 K. HURST 3,534,382

RECORDING APPARATUS USING A METALLIZED RECORDING MEDIUM

Filed Sept. 18, 1967

INVENTOR:
Kurt HURST by Stephen H. Frishauf
Atty

United States Patent Office 3,534,382
Patented Oct. 13, 1970

3,534,382

RECORDING APPARATUS USING A METALLIZED RECORDING MEDIUM

Kurt Hurst, Stuttgart-Feuerbach, Germany, assignor to Robert Bosch G.m.b.H., Stuttgart, Germany, a limited-liability company of Germany Filed Sept. 18, 1967, Ser. No. 668,401
Claims priority, application Germany, Nov. 12, 1966, B 89,814
Int. Cl. G01d *15/08*
U.S. Cl. 346—74 6 Claims

ABSTRACT OF THE DISCLOSURE

A semi-conductor switch element of the breakdown type is inserted in the circuit from a source to a recording point, the metallized layer of a recording medium and back to the source so that sudden application of current will burn off a metal layer, which will break the continuity of the circuit and extinguish the breakdown semi-conductor element, which may be an SCR, a light activated diode switch, a four-layer diode or the like.

The present invention relates to a recording instrument, and more particularly to an instrument in which a record is made by burning off the metal layer of a metallized paper recording medium by means of electrical current applied to the metallized layer from a conductive contact point.

Recording apparatus which does not operate with a continuously supplied recording current, such as facsimile apparatus, punched tapes, or character writers require a rapidly-operating high current switch to switch the recording current on and off. It has been proposed to utilize the charging current of a condenser as the recording current, which is conducted in a circuit between a metal layer on a recording medium and a contact point, and to connect a transistor in parallel to the condenser, which transistor short circuits the condenser when the metal layer is to be burned off at a specific point. The charging current following the short circuit then is strong and burns off the metal layer. This arrangement has the disadvantage that the recording process occurs only after discharge of the condenser, that is after the writing impulse. This introduces a delay which is undesirable in many cases and may result in unsharp images.

It is an object of the present invention to provide a simple recording device in which the writing current is rapidly and effectively controlled without introducing complicated circuit elements.

SUBJECT MATTER OF THE PRESENT INVENTION

The circuit which includes the contact point and the metallized layer of the recording medium has a semiconductor element having thyratron characteristics included therein, such as a breakdown semi-conductor switching element, for example, a silicon controlled rectifier (SCR), a four-layer diode, a light-activated diode switch or the like. Such an element utilizes the characteristics of the recording medium itself, namely, that after the recording current has passed, the contact point is effectively an insulator since the metallized layer is burned off. Thus, the breakdown semi-conductor element is extinguished automatically after each writing pulse. Such semiconductor breakdown elements—in contrast to transistors—can carry substantial currents, have a rapid turn-on time and thus provide for a high writing speed and clear, sharp recording.

The use of SCR's permits high writing current with very low control currents; if light-activated diodes are used, control can be directly by means of light pulses.

The structure, organization and operation of the invention will now be described more specifically with reference to the accompanying drawings, wherein.

Figure 1:
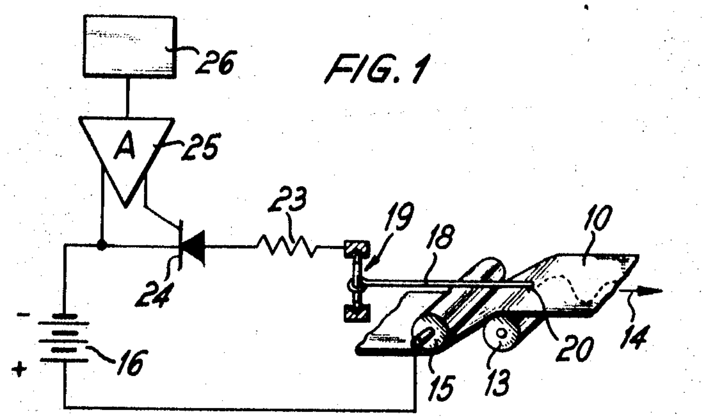
FIG. 1 is a schematic diagram of the present invention utilizing an SCR as a control element.

Referring now to the drawings and particularly to FIG. 1: The recording apparatus utilizes a recording medium 10, illustrated in more detail in FIG. 3, which contains a dielectric carrier, for example, cellulose, paper or the like 11, having a metal layer 12 thereover. The metal layer has a specific resistance between 1 and 50 $\Omega/cm.^2$, preferably between 2 and 10 $\Omega/cm.^2$. The specific resistance is so measured that a strip of 1 cm. wide has a pair of electrodes placed thereover at a distance 1 cm. apart, and the resistance between the electrodes is measured. The thickness of such a metal layer may be between 0.3 to 0.002 $\mu$m.

The record carrier 10 is flexible and is driven, for example, by a clockwork or by an electric motor not shown, over a roller 13 in the direction of arrow 14. A second roller 15, arranged parallel to roller 13 and at a small distance therefrom is so arranged with respect to roller 13 that the record carrier 10 forms an S-shaped curve, so that roller 13 contacts the side 11 of the record carrier 10 whereas roller 15 contacts the metallized layer 12. Roller 13 may be of any material, for example, an insulator; roller 15 consists of an electrically-conductive material, such as carbon, to establish an electrical connection with the metallized layer 12. Roller 15 is connected to the positive terminal of a source of current 16.

A movable pointer 18, carried in a bearing 19 has a conductive contact point 20 which contacts the metallized layer 12. The pointer 18 can be moved mechanically by any device not shown—for example, a measuring instrument, or any desired arrangement which moves the contacting point 20 with respect to the record medium 10.

Contacting point 20 is connected over the pointer 18 and bearing 19 (or a connecting spring, as well known in the art and not shown) with a resistance 23 and then to the anode of an SCR 24, the cathode of which is connected to the negative terminal of source 16.

A transducer or pulse source 26 is connected to an amplifier 25 which connects both with the cathode of the SCR 24 as well as with the control electrode thereof. A transducer may be, for example, a facsimile transmitter.

Figures 3, 4:
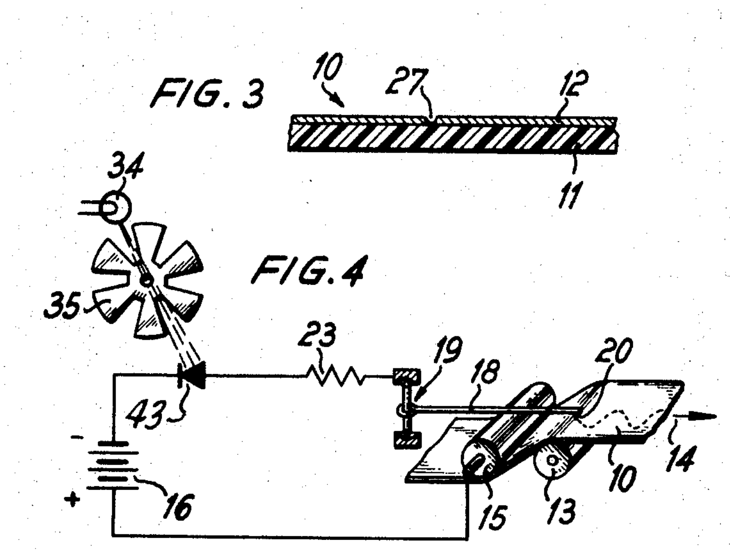
FIG. 3 is an enlarged cross-sectional area through a recording paper with a metal layer, burned off at a specific point.
FIG. 4 is another embodiment of the invention utilizing a light-activated diode switch for control.

Operation of the recorder in accordance with FIG. 1: when a pulse is derived from transducer 26 and applied over amplifier 25 to the SCR 24, the SCR becomes conductive and causes a writing current to be transmitted from the source 16, over roller 15, the metal layer 12, contact point 20, to the resistance 23 and back through the SCR 24. At the point of contact between point 20 and metallized layer 12, a portion of the metallic layer 12 is burned off, as seen in FIG. 3 at 27, greatly enlarged, thus breaking both the metallic continuity as well as the electrical connection. As soon as the writing current is interrupted, and if the writing impulse at SCR 24 has ceased, the SCR 24 becomes non-conductive and the burn-out process terminates by itself. Experiments have shown that a transport speed of up to 20 m./sec will result in turn-off of the SCR, although ordinarily writing speeds of at the most 5 m./sec will be used in order to provide for absolutely certain operation and sharpness of reproduction.

Figure 2:
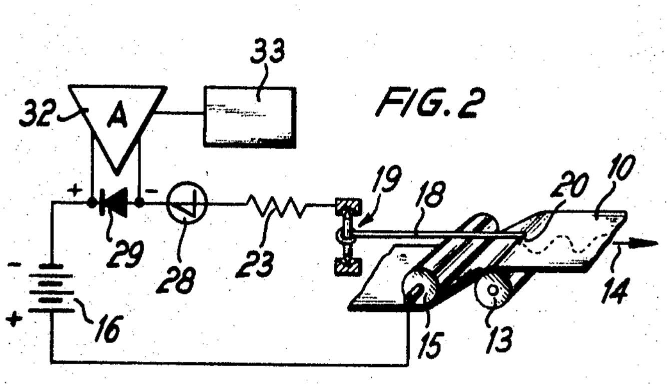
FIG. 2 illustrates another embodiment utilizing a four-layer diode.

The apparatus in accordance with FIG. 2 is substantially similar to that of FIG. 1 and similar parts, having the same reference numerals, will not be described again. Resistance 23 is connected to a four-layer diode, such as a pnpn breakdown 28, in series with a diode 29. A transducer 33, which may again be a facsimile transmitter, is connected to an amplifier 32 which is connected in turn across the diode 29. The amplifier 32 is so adjusted that during a writing impulse the diode 29 has placed a potential thereacross which adds to the potential of the source 16, so that the total potential of source 16 as well as that across diode 29 is greater than the breakdown potential of the four-layer diode 28. As soon as a writing impulse is transmitted from transducer 33 over amplifier 32 to diode 29, then the potential at the four-layer diode 28 rises to breakdown; diode 28 becomes conductive and, as described in connection with FIG. 1, burns a hole into the metal layer 12. This interrupts the writing current, the four-layer doide recovers and becomes non-conductive until the next writing impulse.

FIG. 4 illustrates the arrangement with a light-activated control element, such as a light-activated diode switch, a light-activated silicone controlled rectifier with the control electrode disconnected, or the like. In all other respects, the recording apparatus is similar to the embodiments illustrated in connection with FIGS. 1 and 2.

Connected to the resistance 23 is a light-activated diode switch 43, the cathode of which is connected to the negative terminal of battery 16. Light-activated diode switch 43 is illuminated by a source of light 34. Between light source 34 and the light-activated diode switch is a stroboscopic disc 35, driven at a predetermined speed and periodically interrupting the light applied to the light-activated diode switch 43. When a light impulse is applied thereto, it becomes conductive and, as above described, burns a hole into the metal layer 12. This, again, interrupts the writing current and the light-activated diode switch 43 will become non-conductive until the contact point 20 again contacts a part of the metal layer 12 while simultaneously light shines in the light-activated diode switch 43. Of course, recording instruments having light sources of variable intensity can be used—for example, cathode ray tubes or other light-emitting apparatus. Also, physical phenomena causing emission of light can be recorded directly.

I claim:

1. A recording apparatus for recording of information in combination with a non-conductive recording medium having a conductive layer thereon comprising a source of direct current;

an electrically conductive contact point located adjacent said conductive layer;

an electric circuit connecting said conductive layer on said recording medium to one terminal of said source and further connecting the other terminal of said source to said contact point, said source of direct current supplying sufficient energy to said circuit to burn said conductive coating off said medium;

means feeding said non-conductive recording medium with said conductive coating thereon beneath said stylus;

a controllable breakdown semi-conductor switching element having thyratron characteristics and normally in non-conductive state having its power electrodes inserted in said electric circuit; and control means connected to change the conductivity of said semi-conductive switching element to change-over into conductive state, said electric circuit being closed upon conduction of said controllable breakdown semi-conductor switching element, said electric circuit opening upon burning off of the metallic coating and thus extinguishing conduction of said controllable breakdown semi-conductor switching element.

2. Apparatus as claimed in claim 1 wherein said semi-conductor switching element is a silicon controlled rectifier, and said control means includes a connection to the control gate of said silicon controlled rectifier; and said source of direct current is of sufficient voltage to cause burn-off of said conductive layer when said silicon controlled rectifier is in conductive state.

3. Apparatus as claimed in claim 1 wherein said semi-conductor switching element is a light-activated diode switch and said control means includes a light impulse directed to said light-activated diode switch; and said source of direct current is of sufficient voltage to cause burn-off of said conductive layer on said recording medium when said light-activated diode switch is triggered into conduction.

4. Apparatus as claimed in claim 1 wherein said semi-conductor switching element is a four-layer diode and said control means includes a source of break-down potential connectable in circuit with said four-layer diode to change the state of said four-layer diode to become conductive and apply direct current to said conductive layer on said recording medium causing burn-off of said conductive layer.

5. Apparatus as claimed in claim 4 including a further diode (29) in series with said four-layer diode inserted in said circuit;

said source of breakdown potential for said four-layer diode being connected across said further diode.

6. Apparatus as claimed in claim 5 wherein the breakdown potential connected across said further diode, and the source of direct current have the same polarity and are of such magnitude that the sum of the voltages of the potential across said further diode and of said source of direct current exceeds the breakdown voltage of said four-layer diode, the source of direct current alone being of insufficient magnitude to cause breakdown of said four-layer diode.

References Cited

UNITED STATES PATENTS

| | | | |
|---|---|---|---|
| 3,074,066 | 1/1963 | Conerly | 346—74 |
| 3,335,422 | 8/1967 | Strassberg | 346—74 |
| 3,344,412 | 9/1967 | Goodale et al. | 346—74 XR |

BERNARD KONICK, Primary Examiner

G. M. HOFFMAN, Assistant Examiner